United States Patent
Sun et al.

(10) Patent No.: US 12,232,146 B2
(45) Date of Patent: Feb. 18, 2025

(54) SRS ANTENNA SWITCHING ENHANCEMENT

(71) Applicant: Apple Inc., Cupertino, CA (US)

(72) Inventors: Haitong Sun, Irvine, CA (US); Hong He, Cupertino, CA (US); Wei Zeng, San Diego, CA (US); Dawei Zhang, Saratoga, CA (US); Chunxuan Ye, San Diego, CA (US); Sigen Ye, Whitehouse Station, NJ (US); Weidong Yang, San Diego, CA (US); Chunhai Yao, Beijing (CN); Jie Cui, San Jose, CA (US); Yang Tang, Cupertino, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 401 days.

(21) Appl. No.: 17/437,935

(22) PCT Filed: Oct. 12, 2020

(86) PCT No.: PCT/CN2020/120442
§ 371 (c)(1),
(2) Date: Sep. 10, 2021

(87) PCT Pub. No.: WO2022/077171
PCT Pub. Date: Apr. 21, 2022

(65) Prior Publication Data
US 2022/0303973 A1 Sep. 22, 2022

(51) Int. Cl.
*H04B 7/04* (2017.01)
*H04B 7/0413* (2017.01)
(Continued)

(52) U.S. Cl.
CPC .......... *H04W 72/51* (2023.01); *H04B 7/0413* (2013.01); *H04L 5/0048* (2013.01)

(58) Field of Classification Search
CPC ... H04W 72/51; H04B 7/0413; H04B 7/0608; H04L 5/0048; H04L 5/0023; H04L 5/0082; H04L 5/0091
See application file for complete search history.

(56) References Cited

U.S. PATENT DOCUMENTS

2019/0281588 A1* 9/2019 Zhang ................. H04B 7/0617
2019/0356445 A1 11/2019 Manolakos
(Continued)

FOREIGN PATENT DOCUMENTS

CN 110476391 11/2019
CN 111262679 A 6/2020
(Continued)

OTHER PUBLICATIONS

NTT (Discussion on SRS enhancement, R1-2006423, Aug. 2020).*
(Continued)

*Primary Examiner* — Lakeram Jangbahadur
(74) *Attorney, Agent, or Firm* — Kowert, Hood, Munyon, Rankin & Goetzel, P.C.

(57) ABSTRACT

Apparatuses, systems, and methods for SRS antenna switching. A UE may transmit, to a base station, a capability message indicating an antenna configuration associated with SRS antenna switching e.g., via as RRC signaling. The capability message may indicate at least one of (and/or one or more of) a one transmit point (1T) and six receive point (6R) SRS resource set configuration, a 1T8R SRS resource set configuration, a 2T6R SRS resource set configuration, a 2T8R SRS resource set configuration, and/or a 4T8R SRS resource set configuration. The UE may receive, from the base station, a configuration message, e.g., via RRC signaling. The configuration message may indicate an SRS antenna switching configuration based, at least in part, on the capability message. The UE may transmit, to the base (Continued)

station, one or more SRSs, e.g., according to the SRS antenna switching configuration.

20 Claims, 8 Drawing Sheets

(51) Int. Cl.
 *H04L 5/00* (2006.01)
 *H04W 72/51* (2023.01)

(56) References Cited

U.S. PATENT DOCUMENTS

| | | | | |
|---|---|---|---|---|
| 2021/0112498 A1* | 4/2021 | Duan | ............... | H04L 5/0094 |
| 2021/0384949 A1* | 12/2021 | Kumar | ............... | H04W 76/15 |
| 2022/0216963 A1* | 7/2022 | Chen | ............... | H04L 5/0023 |
| 2023/0188280 A1* | 6/2023 | Ji | ............... | H04B 7/0628 |
| | | | | 370/329 |

FOREIGN PATENT DOCUMENTS

| | | |
|---|---|---|
| TW | 202013914 | 4/2020 |
| WO | 2020077536 A1 | 4/2020 |

OTHER PUBLICATIONS

International Search Report for PCT Patent Application No. PCT/CN2020/120442; mailed Jul. 19, 2021.
NTT Docomo, Inc. "Discussion on SRS enhancement"; 3GPP TSG RAN WG1 #102-e R1-2006723; Aug. 17-28, 2020.
Intel Corporation "Discussion on SRS enhancements"; 3GPP TSG RAN WG1 #102-e R1-2005863; Aug. 17-28, 2020.
Qualcomm Incorporated "Enhancements on SRS flexibility, switching and capacity"; 3GPP TSG RAN WG1 Meeting #102-e R1-2006795; Aug. 17-28, 2020.
Huawei et al. "Enhancements on SRS for Rel-17"; 3GPP TSG RAN WG1 Meeting #102-e R1-2005247; Aug. 17-28, 2020.
Office Action for CN Patent Application No. 202080106109.7; Aug. 15, 2024.
Motorola "Discussion on other SRS Enhancements for LTE-A Uplink," 3GPP TSG RAN WG1 Meeting #61bis R1-103933, Jun. 28, 2010.

* cited by examiner

```
SRS-ResourceSet ::=         SEQUENCE {
    srs-ResourceSetId           SRS-ResourceSetId,
    srs-ResourceIdList          SEQUENCE (SIZE(1..maxNrofSRS-ResourcesPerSet)) OF SRS-ResourceId    OPTIONAL, -- Cond
    resourceType                CHOICE {
        aperiodic                   SEQUENCE {
            aperiodicSRS-ResourceTrigger    INTEGER (1..maxNrofSRS-TriggerStates-1),
            csi-RS                          NZP-CSI-RS-ResourceId                                   OPTIONAL, -- Cond
            slotOffset                      INTEGER (1..32)                                         OPTIONAL, -- Need S
            ...,
            aperiodicSRS-ResourceTriggerList    SEQUENCE (SIZE(1..maxNrofSRS-TriggerStates-2))
                                                    OF INTEGER (1..maxNrofSRS-TriggerStates-1)      OPTIONAL -- Need M
        },
        semi-persistent             SEQUENCE {
            associatedCSI-RS            NZP-CSI-RS-ResourceId                                       OPTIONAL, -- Cond
            ...
        },
        periodic                    SEQUENCE {
            associatedCSI-RS            NZP-CSI-RS-ResourceId                                       OPTIONAL, -- Cond
            ...
        }
    },
    usage                       ENUMERATED {beamManagement, codebook, nonCodebook, antennaSwitching},
```

FIG. 6A
(Prior Art)

```
SRS-Resource ::=         SEQUENCE {
    srs-ResourceId           SRS-ResourceId,
    nrofSRS-Ports            ENUMERATED {port1, ports2, ports4},
    ptrs-PortIndex           ENUMERATED {n0, n1}                   OPTIONAL,  -- Need R
    transmissionComb         CHOICE {
        n2                       SEQUENCE {
                                     combOffset-n2    INTEGER (0..1),
                                     cyclicShift-n2   INTEGER (0..7)
                                 },
        n4                       SEQUENCE {
                                     combOffset-n4    INTEGER (0..3),
                                     cyclicShift-n4   INTEGER (0..11)
                                 }
    },
    resourceMapping          SEQUENCE {
        startPosition            INTEGER (0..5),
        nrofSymbols              ENUMERATED {n1, n2, n4},
        repetitionFactor         ENUMERATED {n1, n2, n4}
    },
    freqDomainPosition       INTEGER (0 .. 67),
    freqDomainShift          INTEGER (0 .. 268),
```

FIG. 6B
(Prior Art)

SRS ANTENNA SWITCHING ENHANCEMENT

PRIORITY CLAIM INFORMATION

This application is a national stage application of International Application No. PCT/CN2020/120442, filed on Oct. 12, 2020, titled "SRS Antenna Switching Enhancement", which is hereby incorporated by reference in its entirety. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The invention relates to wireless communications, and more particularly to apparatuses, systems, and methods for sounding reference signal (SRS) antenna switching enhancement for enhanced multiple-input-multiple-output (MIMO) operation.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Long Term Evolution (LTE) is currently the technology of choice for the majority of wireless network operators worldwide, providing mobile broadband data and high-speed Internet access to their subscriber base. LTE was first proposed in 2004 and was first standardized in 2008. Since then, as usage of wireless communication systems has expanded exponentially, demand has risen for wireless network operators to support a higher capacity for a higher density of mobile broadband users. Thus, in 2015 study of a new radio access technology began and, in 2017, a first release of Fifth Generation New Radio (5G NR) was standardized.

5G-NR, also simply referred to as NR, provides, as compared to LTE, a higher capacity for a higher density of mobile broadband users, while also supporting device-to-device, ultra-reliable, and massive machine type communications with lower latency and/or lower battery consumption. Further, NR may allow for more flexible UE scheduling as compared to current LTE. Consequently, efforts are being made in ongoing developments of 5G-NR to take advantage of higher throughputs possible at higher frequencies.

SUMMARY

Embodiments relate to wireless communications, and more particularly to apparatuses, systems, and methods for sounding reference signal (SRS) antenna switching enhancement for enhanced multiple-input-multiple-output (MIMO) operation.

For example, in some embodiments, a user equipment device (UE), such as UE 106, may be configured to transmit, to a base station, a capability message indicating an antenna configuration associated with SRS antenna switching. The capability message may indicate at least one of (and/or one or more of) a one transmit point (1T) and six receive point (6R) SRS resource set configuration, a 1T8R SRS resource set configuration, a 2T6R SRS resource set configuration, a 2T8R SRS resource set configuration, and/or a 4T8R SRS resource set configuration. In some embodiments, the capability message may be transmitted via higher layer signaling, e.g., such as RRC signaling. The UE may be configured to receive, from the base station, a configuration message, where the configuration message may indicate an SRS antenna switching configuration. In some embodiments, the SRS antenna switching configuration may be based, at least in part, on the capability message. Additionally, the configuration message may be received via higher layer signaling, e.g., such as RRC signaling. Further, the UE may be configured to transmit, to the base station, one or more SRSs, e.g., according to the SRS antenna switching configuration.

As another example, in some embodiments, a base station, such as base station 102, may be configured to receive, from a UE, a capability message indicating an antenna configuration associated with SRS antenna switching. The capability message may indicate at least one of (and/or one or more of) a one transmit point (1T) and six receive point (6R) SRS resource set configuration, a 1T8R SRS resource set configuration, a 2T6R SRS resource set configuration, a 2T8R SRS resource set configuration, and/or a 4T8R SRS resource set configuration. In some embodiments, the capability message may be transmitted via higher layer signaling, e.g., such as RRC signaling. The base station may be configured to transmit, to the UE, a configuration message, where the configuration message may indicate an SRS antenna switching configuration. In some embodiments, the SRS antenna switching configuration may be based, at least in part, on the capability message. Additionally, the configuration message may be transmitted via higher layer signaling, e.g., such as RRC signaling. Further, the base station may be configured to receive, from the UE, one or more SRSs, e.g., according to the SRS antenna switching configuration.

The techniques described herein may be implemented in and/or used with a number of different types of devices, including but not limited to unmanned aerial vehicles (UAVs), unmanned aerial controllers (UACs), a UTM server, base stations, access points, cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIGS. 6A and 6B illustrate RRC parameters for antenna switching.

Figure 1A:
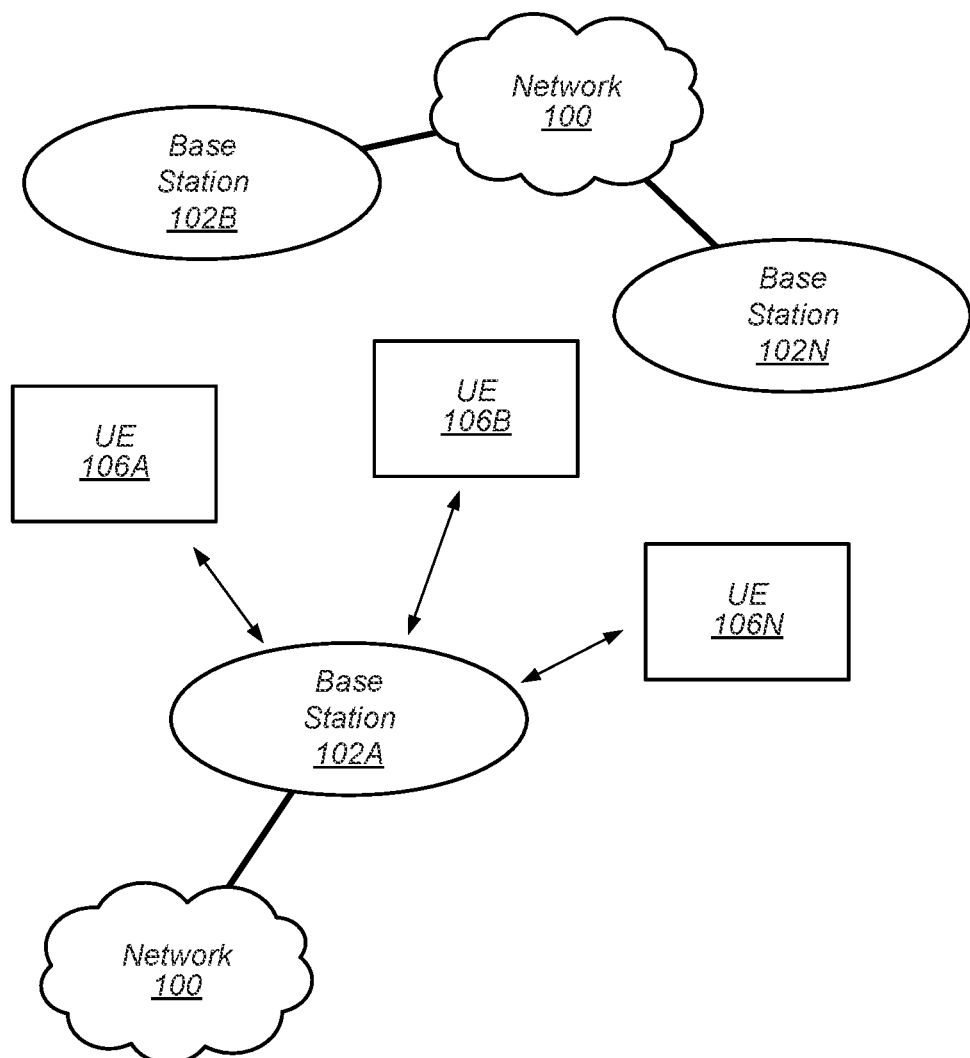
FIG. 1A illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

3GPP: Third Generation Partnership Project
UE: User Equipment
RF: Radio Frequency
BS: Base Station
DL: Downlink
UL: Uplink
LTE: Long Term Evolution
NR: New Radio
5GS: 5G System
5GMM: 5GS Mobility Management
5GC/5GCN: 5G Core Network
IE: Information Element
CE: Control Element
MAC: Medium Access Control
SSB: Synchronization Signal Block
CSI-RS: Channel State Information Reference Signal
PDCCH: Physical Downlink Control Channel
PDSCH: Physical Downlink Shared Channel
RRC: Radio Resource Control
RRM: Radio Resource Management
CORESET: Control Resource Set
TCI: Transmission Configuration Indicator
DCI: Downlink Control Indicator Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™ PlayStation Portable™, Gameboy Advance™, iPhone™), laptops, wearable devices (e.g. smart watch, smart glasses), PDAs, portable Internet devices, music players, data storage devices, other handheld devices, unmanned aerial vehicles (UAVs) (e.g., drones), UAV controllers (UACs), and so forth. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Wi-Fi—The term "Wi-Fi" (or WiFi) has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

3GPP Access—refers to accesses (e.g., radio access technologies) that are specified by 3GPP standards. These accesses include, but are not limited to, GSM/GPRS, LTE, LTE-A, and/or 5G NR. In general, 3GPP access refers to various types of cellular access technologies.

Non-3GPP Access—refers any accesses (e.g., radio access technologies) that are not specified by 3GPP standards. These accesses include, but are not limited to, WiMAX, CDMA2000, Wi-Fi, WLAN, and/or fixed networks. Non-3GPP accesses may be split into two categories, "trusted" and "untrusted": Trusted non-3GPP accesses can interact directly with an evolved packet core (EPC) and/or a 5G core (5GC) whereas untrusted non-3GPP accesses interwork with the EPC/5GC via a network entity, such as an Evolved Packet Data Gateway and/or a 5G NR gateway. In general, non-3GPP access refers to various types on non-cellular access technologies.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 1B:
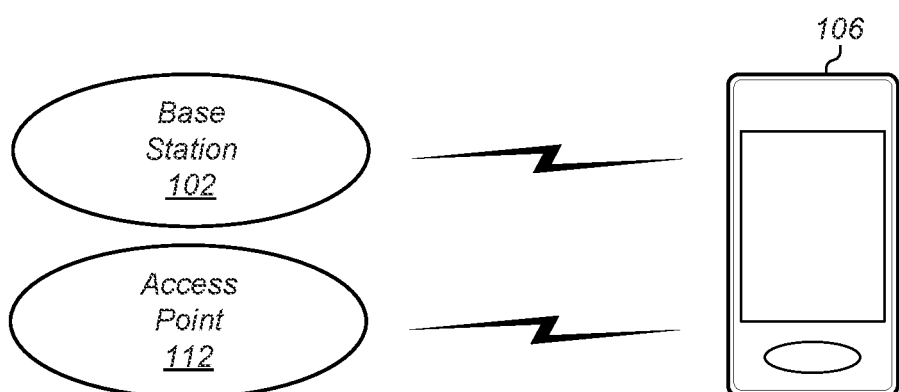
FIG. 1B illustrates an example of a base station (BS) and an access point in communication with a user equipment (UE) device according to some embodiments.

FIGS. 1A and 1B: Communication Systems

FIG. 1A illustrates a simplified example wireless communication system, according to some embodiments. It is noted that the system of FIG. 1A is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternatively be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 1B illustrates user equipment 106 (e.g., one of the devices 106A through 106N) in communication with a base station 102 and an access point 112, according to some embodiments. The UE 106 may be a device with both cellular communication capability and non-cellular communication capability (e.g., Bluetooth, Wi-Fi, and so forth) such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD), LTE/LTE-Advanced, or 5G NR using a single shared radio and/or GSM, LTE, LTE-Advanced, or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 2:
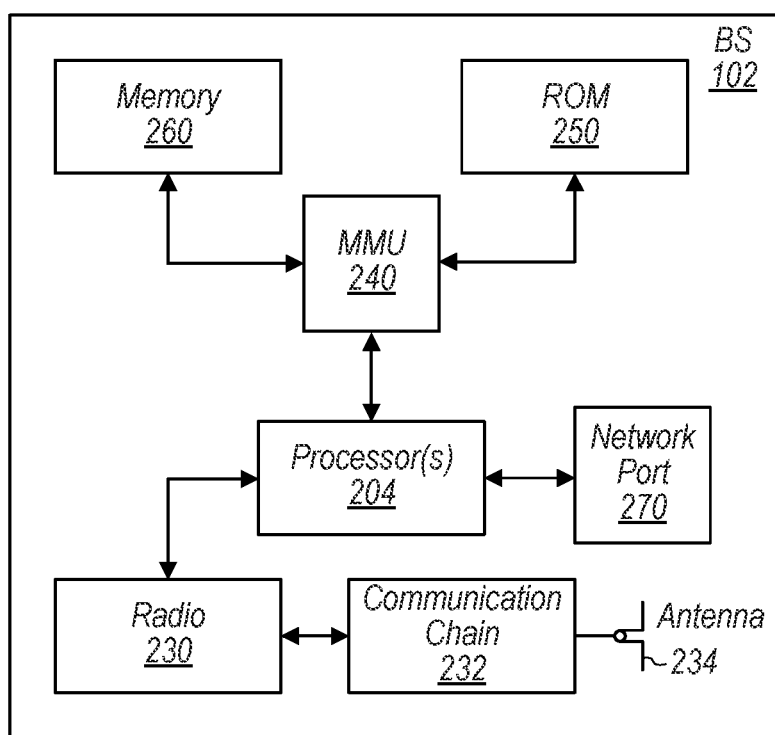
FIG. 2 illustrates an example block diagram of a BS according to some embodiments.

FIG. 2: Block Diagram of a Base Station

FIG. 2 illustrates an example block diagram of a base station 102, according to some embodiments. It is noted that the base station of FIG. 2 is merely one example of a possible base station. As shown, the base station 102 may include processor(s) 204 which may execute program instructions for the base station 102. The processor(s) 204 may also be coupled to memory management unit (MMU) 240, which may be configured to receive addresses from the processor(s) 204 and translate those addresses to locations in memory (e.g., memory 260 and read only memory (ROM) 250) or to other circuits or devices.

The base station 102 may include at least one network port 270. The network port 270 may be configured to couple to a telephone network and provide a plurality of devices, such as UE devices 106, access to the telephone network as described above in FIGS. 1 and 2.

The network port 270 (or an additional network port) may also or alternatively be configured to couple to a cellular network, e.g., a core network of a cellular service provider. The core network may provide mobility related services and/or other services to a plurality of devices, such as UE devices 106. In some cases, the network port 270 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 234, and possibly multiple antennas. The at least one antenna 234 may be configured to operate as a wireless transceiver and may be further configured to communicate with UE devices 106 via radio 230. The antenna 234 communicates with the radio 230 via communication chain 232. Communication chain 232 may be a receive chain, a transmit chain or both. The radio 230 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 204 of the base station 102 may be configured to implement or support implementation of part or all of the methods described herein, e.g., by executing program instructions stored on a memory medium (e.g., a non-transitory computer-readable memory medium). Alternatively, the processor 204 may be configured as a programmable hardware element, such as an FPGA (Field Programmable Gate Array), or as an ASIC (Application Specific Integrated Circuit), or a combination thereof. Alternatively (or in addition) the processor 204 of the BS 102, in conjunction with one or more of the other components 230, 232, 234, 240, 250, 260, 270 may be configured to implement or support implementation of part or all of the features described herein.

In addition, as described herein, processor(s) 204 may be comprised of one or more processing elements. In other words, one or more processing elements may be included in processor(s) 204. Thus, processor(s) 204 may include one or more integrated circuits (ICs) that are configured to perform the functions of processor(s) 204. In addition, each integrated circuit may include circuitry (e.g., first circuitry, second circuitry, etc.) configured to perform the functions of processor(s) 204.

Further, as described herein, radio 230 may be comprised of one or more processing elements. In other words, one or more processing elements may be included in radio 230. Thus, radio 230 may include one or more integrated circuits (ICs) that are configured to perform the functions of radio 230. In addition, each integrated circuit may include circuitry (e.g., first circuitry, second circuitry, etc.) configured to perform the functions of radio 230.

Figure 3:
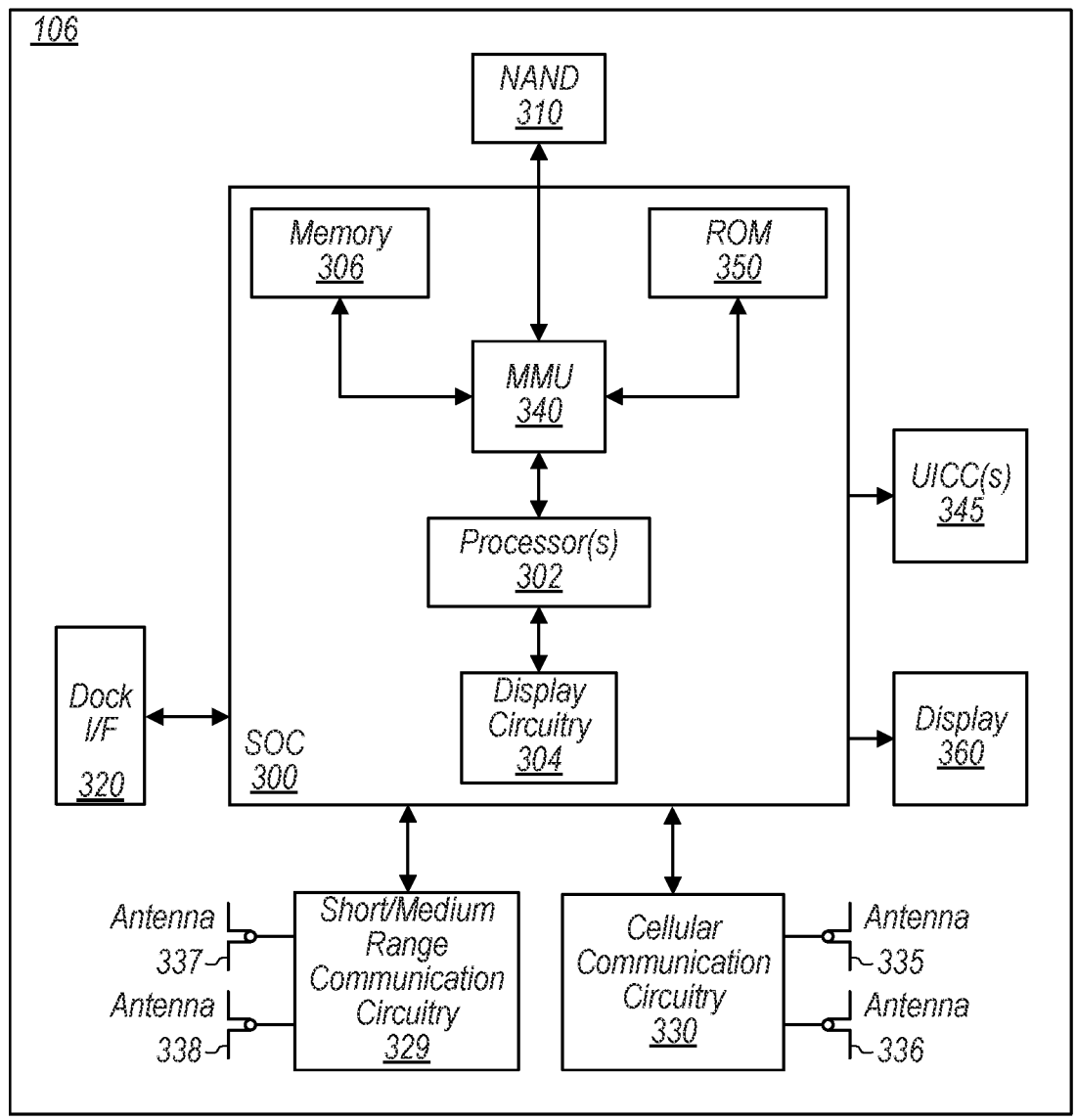
FIG. 3 illustrates an example block diagram of a UE according to some embodiments.

FIG. 3: Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, an unmanned aerial vehicle (UAV), a UAV controller (UAC) and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345. Note that the term "SIM" or "SIM entity" is intended to include any of various types of SIM implementations or SIM functionality, such as the one or more UICC(s) cards 345, one or more eUICCs, one or more eSIMs, either removable or embedded, etc. In some embodiments, the UE 106 may include at least two SIMs. Each SIM may execute one or more SIM applications and/or otherwise implement SIM functionality. Thus, each SIM may be a single smart card that may be embedded, e.g., may be soldered onto a circuit board in the UE 106, or each SIM 345 may be implemented as a removable smart card. Thus, the SIM(s) may be one or more removable smart cards (such as UICC cards, which are sometimes referred to as "SIM cards"), and/or the SIMs 345 may be one or more embedded cards (such as embedded UICCs (eUICCs), which are sometimes referred to as "eSIMs" or "eSIM cards"). In some embodiments (such as when the SIM(s) include an eUICC), one or more of the SIM(s) may implement embedded SIM (eSIM) functionality; in such an embodiment, a single one of the SIM(s) may execute multiple SIM applications. Each of the SIMs may include components such as a processor and/or a memory; instructions for performing SIM/eSIM functionality may be stored in the memory and executed by the processor. In some embodiments, the UE 106 may include a combination of removable smart cards and fixed/non-removable smart cards (such as one or more eUICC cards that implement eSIM functionality), as desired. For example, the UE 106 may comprise two embedded SIMs, two removable SIMs, or a combination of one embedded SIMs and one removable SIMs. Various other SIM configurations are also contemplated.

As noted above, in some embodiments, the UE 106 may include two or more SIMs. The inclusion of two or more SIMs in the UE 106 may allow the UE 106 to support two different telephone numbers and may allow the UE 106 to communicate on corresponding two or more respective networks. For example, a first SIM may support a first RAT such as LTE, and a second SIM 345 support a second RAT such as 5G NR. Other implementations and RATs are of course possible. In some embodiments, when the UE 106 comprises two SIMs, the UE 106 may support Dual SIM Dual Active (DSDA) functionality. The DSDA functionality may allow the UE 106 to be simultaneously connected to two networks (and use two different RATs) at the same time, or to simultaneously maintain two connections supported by two different SIMs using the same or different RATs on the same or different networks. The DSDA functionality may also allow the UE 106 to simultaneously receive voice calls or data traffic on either phone number. In certain embodiments the voice call may be a packet switched communication. In other words, the voice call may be received using voice over LTE (VoLTE) technology and/or voice over NR (VoNR) technology. In some embodiments, the UE 106 may support Dual SIM Dual Standby (DSDS) functionality. The DSDS functionality may allow either of the two SIMs in the UE 106 to be on standby waiting for a voice call and/or data connection. In DSDS, when a call/data is established on one SIM, the other SIM is no longer active. In some embodiments, DSDx functionality (either DSDA or DSDS functionality) may be implemented with a single SIM (e.g., a eUICC) that executes multiple SIM applications for different carriers and/or RATs.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short to medium range wireless communication circuitry 329, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to perform methods for sounding reference signal (SRS) antenna switching enhancement for enhanced multiple-input-multiple-output (MIMO) operation, as further described herein.

As described herein, the communication device 106 may include hardware and software components for implementing the above features for a communication device 106 to communicate a scheduling profile for power savings to a network. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short to medium range wireless communication circuitry 329 may each include one or more processing elements. In other words, one or more processing elements may be included in cellular communication circuitry 330 and, similarly, one or more processing elements may be included in short to medium range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 330. Similarly, the short to medium range wireless communication circuitry 329 may include one or more ICs that are configured to perform the functions of short to medium range wireless communication circuitry 329. In addition, each integrated circuit may include circuitry (e.g., first circuitry, second circuitry, etc.) configured to perform the functions of short to medium range wireless communication circuitry 329.

Figure 4:
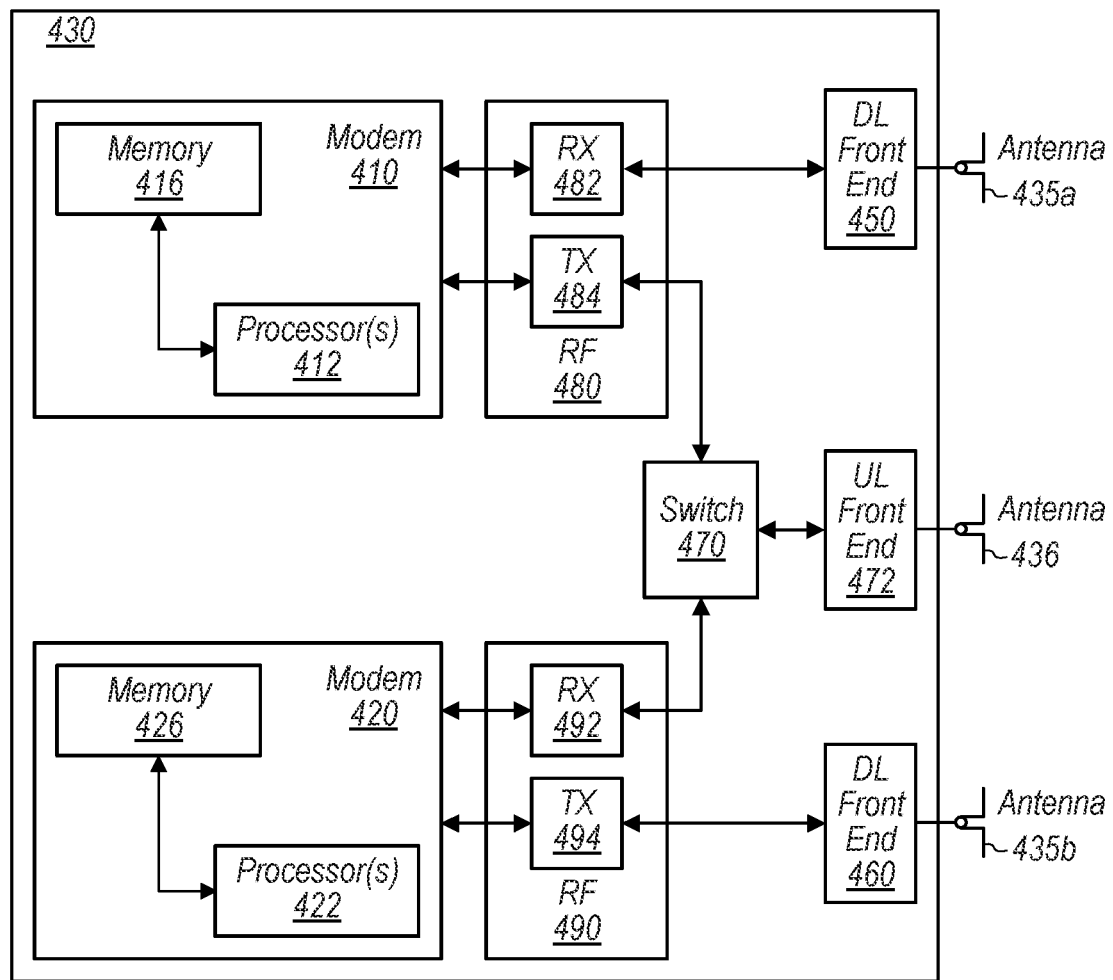
FIG. 4 illustrates an example block diagram of cellular communication circuitry, according to some embodiments.

FIG. 4: Block Diagram of Cellular Communication Circuitry

FIG. 4 illustrates an example simplified block diagram of cellular communication circuitry, according to some embodiments. It is noted that the block diagram of the cellular communication circuitry of FIG. 4 is only one example of a possible cellular communication circuit. According to embodiments, cellular communication circuitry 430, which may be an example of cellular communication circuitry 330, may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 430 may couple (e.g., communicatively; directly or indirectly) to one or more antennas, such as antennas 435a-b and 436 as shown (in FIG. 4). In some embodiments, cellular communication circuitry 430 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 4, cellular communication circuitry 430 may include a modem 410 and a modem 420. Modem 410 may be configured for communications according to a first RAT, e.g., such as LTE or LTE-A, and modem 420 may be configured for communications according to a second RAT, e.g., such as 5G NR.

As shown, modem 410 may include one or more processors 412 and a memory 416 in communication with processors 412. Modem 410 may be in communication with a radio frequency (RF) front end 480. RF front end 480 may include circuitry for transmitting and receiving radio signals. For example, RF front end 480 may include receive circuitry (RX) 482 and transmit circuitry (TX) 484. In some embodiments, receive circuitry 482 may be in communication with downlink (DL) front end 450, which may include circuitry for receiving radio signals via antenna 435a.

Similarly, modem 420 may include one or more processors 422 and a memory 426 in communication with processors 422. Modem 420 may be in communication with an RF front end 490. RF front end 490 may include circuitry for transmitting and receiving radio signals. For example, RF front end 490 may include receive circuitry 492 and transmit circuitry 494. In some embodiments, receive circuitry 492 may be in communication with DL front end 460, which may include circuitry for receiving radio signals via antenna 435b.

In some embodiments, a switch 470 may couple transmit circuitry 494 to uplink (UL) front end 472. In addition, switch 470 may couple transmit circuitry 494 to UL front end 472. UL front end 472 may include circuitry for transmitting radio signals via antenna 436. Thus, when cellular communication circuitry 430 receives instructions to transmit according to the first RAT (e.g., as supported via modem 410), switch 470 may be switched to a first state that allows modem 410 to transmit signals according to the first RAT (e.g., via a transmit chain that includes transmit circuitry 484 and UL front end 472). Similarly, when cellular communication circuitry 430 receives instructions to transmit according to the second RAT (e.g., as supported via modem 420), switch 470 may be switched to a second state that allows modem 420 to transmit signals according to the second RAT (e.g., via a transmit chain that includes transmit circuitry 494 and UL front end 472).

In some embodiments, the cellular communication circuitry 430 may be configured to perform methods for sounding reference signal (SRS) antenna switching enhancement for enhanced multiple-input-multiple-output (MIMO) operation, as further described herein.

As described herein, the modem 410 may include hardware and software components for implementing the above features or for time division multiplexing UL data for NSA NR operations, as well as the various other techniques described herein. The processors 412 may be configured to implement part or all of the features described herein, e.g., by executing program instructions stored on a memory medium (e.g., a non-transitory computer-readable memory medium). Alternatively (or in addition), processor 412 may be configured as a programmable hardware element, such as an FPGA (Field Programmable Gate Array), or as an ASIC (Application Specific Integrated Circuit). Alternatively (or in addition) the processor 412, in conjunction with one or more of the other components 430, 432, 434, 450, 470, 472, 435 and 436 may be configured to implement part or all of the features described herein.

In addition, as described herein, processors 412 may include one or more processing elements. Thus, processors 412 may include one or more integrated circuits (ICs) that are configured to perform the functions of processors 412. In addition, each integrated circuit may include circuitry (e.g., first circuitry, second circuitry, etc.) configured to perform the functions of processors 412.

As described herein, the modem 420 may include hardware and software components for implementing the above features for communicating a scheduling profile for power savings to a network, as well as the various other techniques described herein. The processors 422 may be configured to implement part or all of the features described herein, e.g., by executing program instructions stored on a memory medium (e.g., a non-transitory computer-readable memory medium). Alternatively (or in addition), processor 422 may be configured as a programmable hardware element, such as an FPGA (Field Programmable Gate Array), or as an ASIC (Application Specific Integrated Circuit). Alternatively (or in addition) the processor 422, in conjunction with one or more of the other components 440, 442, 444, 450, 470, 472, 435 and 436 may be configured to implement part or all of the features described herein.

In addition, as described herein, processors 422 may include one or more processing elements. Thus, processors 422 may include one or more integrated circuits (ICs) that are configured to perform the functions of processors 422. In addition, each integrated circuit may include circuitry (e.g., first circuitry, second circuitry, etc.) configured to perform the functions of processors 422.

Figure 5:
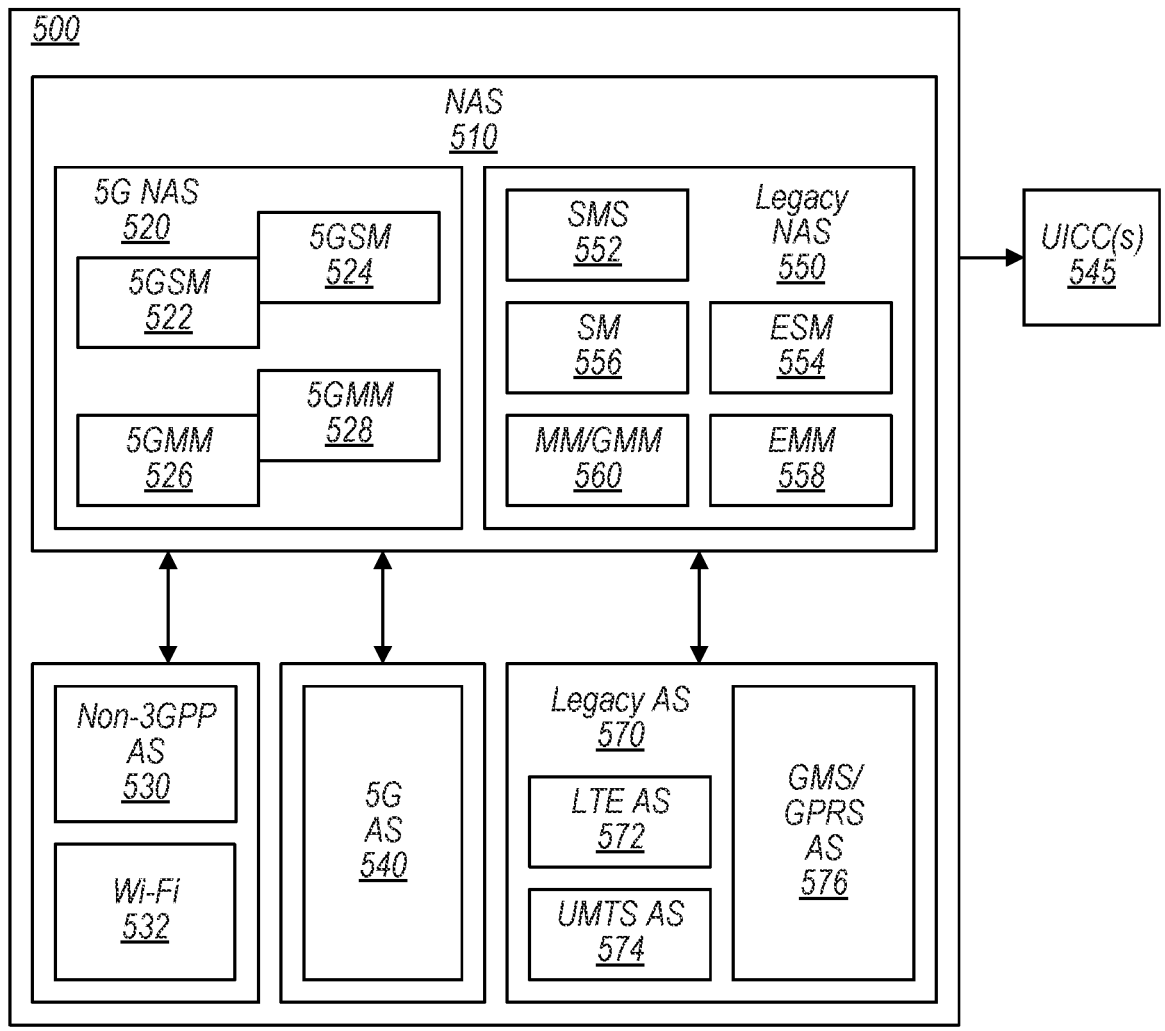
FIG. 5 illustrates an example of a baseband processor architecture for a UE, according to some embodiments.

FIG. 5: Block Diagram of a Baseband Processor

FIG. 5 illustrates an example of a baseband processor architecture for a UE (e.g., such as UE 106), according to some embodiments. The baseband processor architecture 500 described in FIG. 5 may be implemented on one or more radios (e.g., radios 329, 330 and/or 430 described above) or modems (e.g., modems 410 and/or 420) as described above. As shown, the non-access stratum (NAS) 510 may include a 5G NAS 520 and a legacy NAS 550. The legacy NAS 550 may include a communication connection with a legacy access stratum (AS) 570. The 5G NAS 520 may include communication connections with both a 5G AS 540 and a non-3GPP AS 530 and Wi-Fi AS 532. The 5G NAS 520 may include functional entities associated with both access stratums. Thus, the 5G NAS 520 may include multiple 5G MM entities 526 and 528 and 5G session management (SM) entities 522 and 524. The legacy NAS 550 may include functional entities such as short message service (SMS) entity 552, evolved packet system (EPS) session management (ESM) entity 554, session management (SM) entity 556, EPS mobility management (EMM) entity 558, and mobility management (MM)/GPRS mobility management (GMM) entity 560. In addition, the legacy AS 570 may include functional entities such as LTE AS 572, UMTS AS 574, and/or GSM/GPRS AS 576.

Thus, the baseband processor architecture 500 allows for a common 5G-NAS for both 5G cellular and non-cellular (e.g., non-3GPP access). Note that as shown, the 5G MM may maintain individual connection management and registration management state machines for each connection. Additionally, a device (e.g., UE 106) may register to a single PLMN (e.g., 5G CN) using 5G cellular access as well as non-cellular access. Further, it may be possible for the device to be in a connected state in one access and an idle state in another access and vice versa. Finally, there may be common 5G-MM procedures (e.g., registration, de-registration, identification, authentication, as so forth) for both accesses.

Note that in various embodiments, one or more of the above described functional entities of the 5G NAS and/or 5G AS may be configured to perform methods such as sounding reference signal (SRS) antenna switching enhancement for enhanced multiple-input-multiple-output (MIMO) operation, e.g., as further described herein.

SRS Antenna Switching Enhancement

In current cellular communication systems, a user equipment device (UE) may periodically transmit a sounding reference signal (SRS) to a base station on an uplink channel. The SRS signal may be used by the base station to assess the uplink channel quality between the UE and the base station. More particularly, the base station often allocates only a portion of the full system bandwidth to a specific UE at any given time, thus, the base station may use the received SRS signal to determine which portion of the overall system bandwidth has the best relative uplink channel quality, e.g., for communications with the specific UE. In other words, the base station may use the received SRS signals from various UEs to allocate a "best" frequency region to each of the UEs, based on the uplink channel quality determined from the SRS signals.

In addition, in current cellular communication systems, a UE may be configured to transmit an SRS signal at predefined intervals, e.g., according to a set period. However, the base station can also make a specific aperiodic request for the UE to transmit an SRS signal. The base station's request for an aperiodic SRS may take the form of an SRS trigger that is transmitted from the base station to the UE. The base station may decide to send an aperiodic SRS trigger to the UE based on a detection of degradation in uplink channel quality as well as for other reasons.

In current implementations, the base station can perform aperiodic SRS (AP-SRS) triggering in various DCI formats, including uplink (UL) DCI formats 0_1 and 0_2 and downlink (DL) DCI formats 1_1 and 1_2, and DCI format 2_3.

Further, in current implementations, such as 3GPP Release 15, a sound reference signal (SRS) can only be transmitted in the last six symbols of each slot. In 3GPP Release 16, an SRS can be transmitted in any symbol for Fifth Generation (5G) New Radio (NR) positioning and NR in unlicensed spectrum (NR-U) or NR positioning. In addition, an SRS can be repeated for up to four symbols. Further, simple repetition of the SRS without any cover code is supported.

Additionally, in current implementations of 5G NR, there are two types of reference signals (demodulation reference signal (DMRS) and SRS) that a UE may transmit to a base station (e.g., in the uplink) to indicate information about channel quality. Further, the base station may base various decisions associated with resource allocation for uplink transmission, link adaptation, and decoding of transmitted data from the UE based on these reference signals. In particular, an SRS is an UL reference signal which provides information about the combined effect of multipath fading, scattering, Doppler and power loss of a transmitted signal from the UE. Thus, a base station may estimate channel quality using an SRS and manage further resource scheduling, beam management, and power control of a signal based on the SRS. Hence, an SRS may provide information to the base station about the channel over a full bandwidth and, based on this information, the base station may make determinations for resource allocation, e.g., such as determining which bandwidth has better channel quality comparing to other bandwidth regions.

In addition, in current implementations, SRS antenna switching, e.g., as configured via radio resource control (RRC) signaling, only supports certain user equipment device (UE) configurations. For example, current implementations, e.g., 3GPP Release 15 and 16, support UE configurations of one transmit antenna with two receive antennas (1T2R), one transmit antenna with four receive antennas (1T4R), and two transmit antennas with four receive antennas (2T4R). In other words, a UE may perform antenna switching in various way depending on an RRC parameter setting in SRS-ResourceSet as described in 3GPP TS 38.214, section 6.2.1.2.

As illustrated by FIGS. 6A and 6B, SRS antenna switching may be configured via an SRS-ResourceSet parameter and an SRS-Resource parameter. In particular, an srs-ResourceIDList parameter of the SRSResourceSet parameter may identify a list of SRS-Resources for antenna switching and a usage parameter may indicate a configuration as a configuration for antenna switching. Additionally, the SRS-Resource parameter, among configuring various settings, may indicate a number of ports for antenna switching, a time domain resource allocation for antenna switching, and/or a frequency domain resource allocation for antenna switching.

For example, for 1T2R UE configurations, a base station may configure, e.g., via the SRS-RescoureSet parameter and the SRS-Resource parameter, no more than two SRS resource sets with a different value of "resourceType", e.g., aperiodic (AP), semi-persistent (SP), and/or periodic (P). Additionally, in each SRS-ResourceSet set, two SRS resources are transmitted in different symbols and each SRS resource in a given set consists of a single SRS port. Thus, an SRS port 0 of a first SRS resource may be associated with a UE antenna port 0 and an SRS port 0 of a second SRS resource may be associated with a UE antenna port 1.

As another example, for 2T4R UE configurations, a base station may configure, e.g., via the SRS-RescoureSet parameter and the SRS-Resource parameter, no more than two SRS resource sets with a different value of "resourceType", e.g., AP, SP, and/or P. Additionally, in each SRS-ResourceSet set, two SRS resources are transmitted in different symbols and each SRS resource in a given set consists of two SRS ports. Thus, an SRS port 0 of a first SRS resource may be associated with a UE antenna port 0, an SRS port 1 of the first SRS resource may be associated with a UE antenna port 1, an SRS port 0 of a second SRS resource may be associated with a UE antenna port 2, and an SRS port 1 of the second SRS resource may be associated with a UE antenna port 3.

As a further example, for 1T4R UE configurations, a base station may configure, e.g., via the SRS-RescoureSet parameter and the SRS-Resource parameter, no more than 1 SRS resource sets with a "resourceType" set to periodic or semi-persistent. Additionally, four SRS resources are transmitted in different symbols and each SRS resource consists of a single SRS port. Thus, an SRS port 0 of a first SRS resource may be associated with a UE antenna port 0, an SRS port 0 of a second SRS resource may be associated with a UE antenna port 1, an SRS port 0 of a third SRS resource may be associated with a UE antenna port 2, and an SRS port 0 of a fourth SRS resource may be associated with a UE antenna port 3.

As a yet further example, for 1T4R UE configurations, a base station may configure, e.g., via the SRS-RescoureSet parameter and the SRS-Resource parameter, no more than two SRS resources sets with a "resourceType" set to aperiodic. Additionally, four SRS resources are transmitted in different symbols of two different slots. The two SRS resource sets may each be configured with two SRS resources or one set may be configured with one SRS resource and the other set may be configured with three SRS resources. In addition, the UE may expect that the two sets are both configured with the same values of higher layer parameters alpha, p0, pathlossReferenceRS, and srs-PowerControlAdjustmentStates. Further, the UE may expect that a value of the higher layer parameter aperiodicSRS-ResourceTrigger or a value of an entry in AperiodicSRS-ResourceTriggerList in each SRS-ResourceSet is the same and a value of the higher layer parameter slotOffset in each SRS-ResourceSet is different.

Embodiments described herein provide systems, methods, and mechanisms for SRS antenna switching enhancements. For example, embodiments described herein may support a base station, via RRC signaling, configuring a UE for SRS antenna switching for UE configurations including 4T8R, 2T8R, 2T6R, 1T6R, 1T8R, and/or 4T6R.

For example, in some embodiments, to support a 4T8R UE configuration, a base station, such as base station 102, may configure, via RRC signaling, no more than two SRS resource sets with a different value of "resourceType", e.g., aperiodic (AP), semi-persistent (SP), and/or periodic (P). Additionally, in each SRS-ResourceSet set, two SRS resources may be transmitted in different symbols and each SRS resource in a given set may include (and/or comprise) four SRS ports.

As another example, in some embodiments, to support a 2T8R UE configuration, a base station, such as base station 102, may configure, via RRC signaling, no more than 1 SRS resource sets with a "resourceType" set to periodic or semi-persistent. Additionally, four SRS resources may be transmitted in different symbols and each SRS resource may include (and/or comprise) two SRS ports. Additionally, in some embodiments, to support a 2T8R UE configuration, a base station, such as base station 102, may configure no more than two SRS resources sets with a "resourceType" set to aperiodic. Additionally, four SRS resources are transmitted in different symbols of two different slots. The two SRS resource sets may each be configured with two SRS resources or one set may be configured with one SRS resource and the other set may be configured with three SRS resources. Further, each SRS resource may include (and/or comprise) two SRS ports. In addition, the UE may expect that the two sets are both configured with the same values of higher layer parameters alpha, p0, pathlossReferenceRS, and srs-PowerControlAdjustmentStates. Further, the UE may expect that a value of the higher layer parameter aperiodicSRS-ResourceTrigger or a value of an entry in AperiodicSRS-ResourceTriggerList in each SRS-ResourceSet is the same and a value of the higher layer parameter slotOffset in each SRS-ResourceSet is different.

As a further example, in some embodiments, to support a 2T6R UE configuration, a base station, such as base station 102, may configure, via RRC signaling, no more than 1 SRS resource sets with a "resourceType" set to periodic or semi-persistent. Additionally, three SRS resources may be transmitted in different symbols and each SRS resource may include (and/or comprise) two SRS ports. Additionally, in some embodiments, to support a 2T6R UE configuration, a base station, such as base station 102, may configure no more than two SRS resources sets with a "resourceType" set to aperiodic. Additionally, three SRS resources are transmitted in different symbols of two different slots. A first SRS resource set may be configured with two SRS resources and a second SRS resource set may be configured with one SRS resource. Further, each SRS resource may include (and/or comprise) two SRS ports. In addition, the UE may expect that the two sets are both configured with the same values of higher layer parameters alpha, p0, pathlossReferenceRS, and srs-PowerControlAdjustmentStates. Further, the UE may expect that a value of the higher layer parameter aperiodicSRS-ResourceTrigger or a value of an entry in AperiodicSRS-ResourceTriggerList in each SRS-Resource-Set is the same and a value of the higher layer parameter slotOffset in each SRS-ResourceSet is different.

As a yet further example, in some embodiments, to support a 1T6R UE configuration, a base station, such as base station 102, may configure, via RRC signaling, no more than 1 SRS resource sets with a "resourceType" set to periodic or semi-persistent. Additionally, six SRS resources may be transmitted in different symbols and each SRS resource may include (and/or comprise) one SRS port. Additionally, in some embodiments, to support a 1T6R UE configuration, a base station, such as base station 102, may configure no more than two SRS resources sets with a "resourceType" set to aperiodic. Additionally, a first SRS resource set may be configured with a first number of SRS resources, each SRS resource including (and/or comprising) 1 SRS port and a second SRS resource set may be configured with a second number of SRS resources, each SRS resource including (and/or comprising) 1 SRS port. In some embodiments, a total number of SRS resources, e.g., a sum of the first number of SRS resources and the second number of SRS resources, may equal six. In addition, the UE may expect that the two sets are both configured with the same values of higher layer parameters alpha, p0, pathlossReferenceRS, and srs-PowerControlAdjustmentStates. Further, the UE may expect that a value of the higher layer parameter aperiodicSRS-ResourceTrigger or a value of an entry in AperiodicSRS-ResourceTriggerList in each SRS-Resource-Set is the same and a value of the higher layer parameter slotOffset in each SRS-ResourceSet is different.

As another example, in some embodiments, to support a 1T8R UE configuration, such as base station 102, may configure, via RRC signaling, two or more SRS resources sets with a "resourceType" set to aperiodic. For example, a first SRS resource set may be configured with a first number of SRS resources, each SRS resource including (and/or comprising) 1 SRS port and a second SRS resource set may be configured with a second number of SRS resources, each SRS resource including (and/or comprising) 1 SRS port. Thus, a total number of SRS resources, e.g., a sum of the first number of SRS resources and the second number of SRS resources, may equal eight. As another example, a first SRS resource set may be configured with a first number of SRS resources, each SRS resource including (and/or comprising) 1 SRS port, a second SRS resource set may be configured with a second number of SRS resources, each SRS resource including (and/or comprising) 1 SRS port, and a third SRS resource set may be configured with a third number of SRS resources, each SRS resource including (and/or comprising) 1 SRS port. Thus, a total number of SRS resources, e.g., a sum of the first number of SRS resources, the second number of SRS resources, and the third number of SRS resources may equal eight. As a further example, a first SRS resource set may be configured with a first number of SRS resources, each SRS resource including (and/or comprising) 1 SRS port, a second SRS resource set may be configured with a second number of SRS resources, each SRS resource including (and/or comprising) 1 SRS port, a third SRS resource set may be configured with a third number of SRS resources, each SRS resource including (and/or comprising) 1 SRS port, and a fourth SRS resource set may be configured with a fourth number of SRS resources, each SRS resource including (and/or comprising) 1 SRS port. Thus, a total number of SRS resources, e.g., a sum of the first number of SRS resources, the second number of SRS resources, the third number of SRS resources, and the fourth number of SRS resources may equal eight. In addition, the UE may expect that the two sets are both configured with the same values of higher layer parameters alpha, p0, pathlossReferenceRS, and srs-PowerControlAdjustmentStates. Further, the UE may expect that a value of the higher layer parameter aperiodicSRS-ResourceTrigger or a value of an entry in AperiodicSRS-ResourceTriggerList in each SRS-Resource-Set is the same and a value of the higher layer parameter slotOffset in each SRS-ResourceSet is different.

Figure 7:
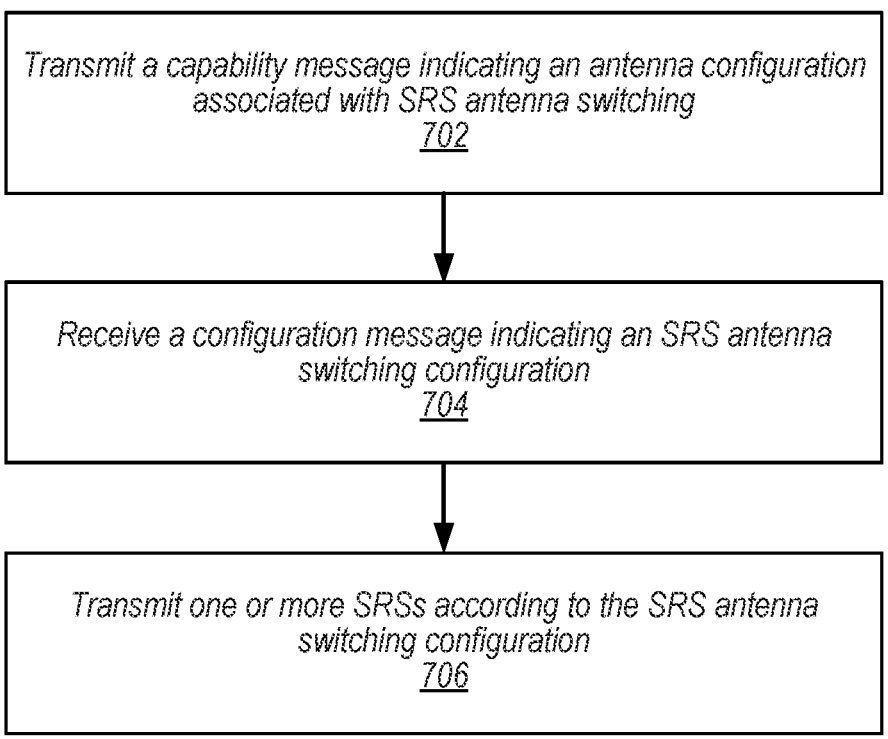
FIG. 7 illustrates a block diagram of an example of a method for configuring sounding reference signal (SRS) antenna switching, according to some embodiments.

FIG. 7 illustrates a block diagram of an example of a method for configuring sounding reference signal (SRS) antenna switching, according to some embodiments. The method shown in FIG. 7 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 702, a UE, such as UE 106, may transmit, to a base station, such as base station 102, a capability message indicating an antenna configuration associated with SRS antenna switching. In some embodiments, the capability message may indicate at least the support of one of (and/or one or more of) a one transmit point (1T) and six receive point (6R) SRS resource set configuration, a 1T8R SRS resource set configuration, a 2T6R SRS resource set configuration, a 2T8R SRS resource set configuration, and/or a 4T8R SRS resource set configuration. In some embodiments, the capability message may be transmitted via higher layer signaling. In some embodiments, the higher layer signaling may include RRC signaling.

At 704, the UE may receive, from the base station, a configuration message. In some embodiments, the configuration message may indicate an SRS antenna switching configuration. In some embodiments, the SRS antenna switching configuration may be based, at least in part, on the capability message. In some embodiments, the configuration message may be received via higher layer signaling. In some embodiments, the higher layer signaling may include RRC signaling.

In some embodiments, the configuration message may indicate that at least one SRS resource set may be configured with a resource type of periodic and/or semi-persistent. In some embodiments, when the capability message indicates a 1T6R SRS resource set configuration, when the capability message indicates a 1T6R SRS resource set configuration, the configuration message may indicate six SRS resources. Additionally, when the capability message indicates a 1T6R SRS resource set configuration, the configuration message may indicate that each SRS resource may include one SRS port. Further, when the capability message indicates a 1T6R SRS resource set configuration, the configuration message may indicate that the six SRS resources may be transmitted in different symbols. In some embodiments, when the capability message indicates a 2T6R SRS resource set configuration, the configuration message may indicate three SRS resources. Additionally, when the capability message indicates a 2T6R SRS resource set configuration, the configuration message may indicate each SRS resource includes two SRS ports. Further, when the capability message indicates a 2T6R SRS resource set configuration, the configuration message may indicate that the three SRS resources may be transmitted in different symbols. In some embodiments, when the capability message indicates a 2T8R SRS resource set configuration, the configuration message may indicate four SRS resources. Additionally, when the capability message indicates a 2T8R SRS resource set configuration, the configuration message may indicate that each SRS resource may include two SRS ports. Further, when the capability message indicates a 2T8R SRS resource set configuration, the configuration message may indicate that the four SRS resources may be transmitted in different symbols.

In some embodiments, the configuration message may indicate that at least two SRS resource sets may be configured with a resource type of aperiodic. In some embodiments, when the capability message indicates a 1T6R SRS resource set configuration, the configuration message may indicate a first set of SRS resources and a second set of SRS resources. Additionally, when the capability message indicates a 1T6R SRS resource set configuration, the configuration message may indicate that each SRS resource in the first set of SRS resources may include one SRS port and that each SRS resource in the second set of SRS resources may include one SRS port. Further, when the capability message indicates a 1T6R SRS resource set configuration, the configuration message may indicate a total of six SRS resources are between the first set of SRS resources and the second set of SRS resources. In some embodiments, when the capability message indicates a 2T6R SRS resource set configuration, the configuration message may indicate a first set of SRS resources and a second set of SRS resources. Additionally, when the capability message indicates a 2T6R SRS resource set configuration, the configuration message may indicate that each SRS resource in the first set of SRS resources includes two SRS ports and that each SRS resource in the second set of SRS resources includes two SRS port. Further, when the capability message indicates a 2T6R SRS resource set configuration, the configuration message may indicate a total of three SRS resources between the first set of SRS resources and the second set of SRS resources. In some embodiments, when the capability message indicates a 2T8R SRS resource set configuration, the configuration message may indicate a first set of SRS resources and a second set of SRS resources. Additionally, when the capability message indicates a 2T8R SRS resource set configuration, the configuration message may indicate that each SRS resource in the first set of SRS resources includes two SRS ports and that each SRS resource in the second set of SRS resources includes two SRS ports. Further, when the capability message indicates a 2T8R SRS resource set configuration, the configuration message may indicate a total of four SRS resources between the first set of SRS resources and the second set of SRS resources.

In some embodiments, the configuration message may indicate that at least three SRS resource sets are configured with a resource type of aperiodic. In some embodiments, when the capability message indicates a 1T6R SRS resource set configuration, the configuration message may indicate a first set of SRS resources, a second set of SRS resources, and a third set of SRS resources. Additionally, when the capability message indicates a 1T6R SRS resource set configuration, the configuration message may indicate that each SRS resource in the first set of SRS resources includes one SRS port, that each SRS resource in the second set of SRS resources includes one SRS port, and that each SRS resource in the third set of SRS resources includes one SRS port. Further, when the capability message indicates a 1T6R SRS resource set configuration, the configuration message may indicate a total of six SRS resources between the first set of SRS resources, the second set of SRS resources, and the third set of SRS resources.

In some embodiments, when the capability message indicates a 4T8R SRS resource set configuration, the configuration message may indicate that up to two SRS resource sets are configured with a different resource type, where resource types include periodic, semi-persistent, or aperiodic. In some embodiments, the configuration message may indicate that each SRS resource set includes four SRS ports.

In some embodiments, when the capability message indicates a 1T8R SRS resource set configuration, the configuration message may indicate that more than two SRS resource sets are configured with a resource type of aperiodic. In some embodiments, the configuration message may indicate at least a first set of SRS resources and a second set of SRS resources. Additionally, the configuration message may indicate that each SRS resource in the first set of SRS resources includes one SRS port and that each SRS resource in the second set of SRS resources includes one SRS port. Further, the configuration message may indicate a total of eight SRS resources between the first set of SRS resources and the second set of SRS resources.

In some embodiments, when the capability message indicates a 1T8R SRS resource set configuration, the configuration message may indicate at least a first set of SRS resources, a second set of SRS resources, and a third set of SRS resources. Additionally, the configuration message may indicate that each SRS resource in the first set of SRS resources includes one SRS port, that each SRS resource in the second set of SRS resources includes one SRS port, and that each SRS resource in the third set of SRS resources includes one SRS port. Further, the configuration message may indicate a total of eight SRS resources between the first set of SRS resources, the second set of SRS resources, and the third set of SRS resources.

In some embodiments, when the capability message indicates a 1T8R SRS resource set configuration, the configuration message may indicate at least a first set of SRS resources, a second set of SRS resources, a third set of SRS resources, and a fourth set of SRS resources. Additionally, the configuration message may indicate that each SRS resource in the first set of SRS resources includes one SRS port, that each SRS resource in the second set of SRS resources includes one SRS port, that each SRS resource in the third set of SRS resources includes one SRS port, and that each SRS resource in the fourth set of SRS resources includes one SRS port. Further, the configuration message may indicate a total of eight SRS resources between the first set of SRS resources, the second set of SRS resources, the third set of SRS resources, and the fourth set of SRS resources.

At 706, the UE may transmit, to the base station, one or more SRSs. In some embodiments, the one or more SRSs may be transmitted according to the SRS antenna switching configuration.

Figure 8:
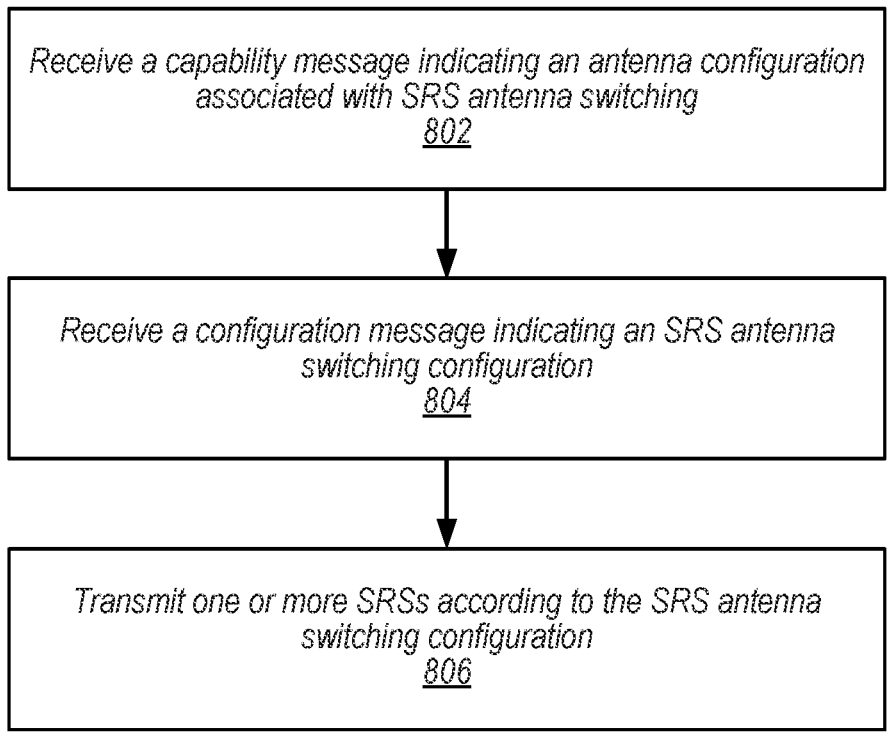
FIG. 8 illustrates a block diagram of another example of a method for configuring sounding reference signal (SRS) antenna switching, according to some embodiments.

FIG. 8 illustrates a block diagram of another example of a method for configuring sounding reference signal (SRS) antenna switching, according to some embodiments. The method shown in FIG. 8 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 802, a base station, such as base station 102, may receive, from a UE, such as UE 106, a capability message indicating an antenna configuration associated with SRS antenna switching. In some embodiments, the capability message may indicate at least one of (and/or one or more of) a one transmit point (1T) and six receive point (6R) SRS resource set configuration, a 1T8R SRS resource set configuration, a 2T6R SRS resource set configuration, a 2T8R SRS resource set configuration, and/or a 4T8R SRS resource set configuration. In some embodiments, the capability message may be received via higher layer signaling. In some embodiments, the higher layer signaling may include RRC signaling.

At 804, the base station may transmit, to the UE, a configuration message. In some embodiments, the configuration message may indicate an SRS antenna switching configuration. In some embodiments, the SRS antenna switching configuration may be based, at least in part, on the capability message. In some embodiments, the configuration message may be transmitted via higher layer signaling. In some embodiments, the higher layer signaling may include RRC signaling.

In some embodiments, the configuration message may indicate that at least one SRS resource set may be configured with a resource type of periodic and/or semi-persistent. In some embodiments, when the capability message indicates a 1T6R SRS resource set configuration, when the capability message indicates a 1T6R SRS resource set configuration, the configuration message may indicate six SRS resources. Additionally, when the capability message indicates a 1T6R SRS resource set configuration, the configuration message may indicate that each SRS resource may include one SRS port. Further, when the capability message indicates a 1T6R SRS resource set configuration, the configuration message may indicate that the six SRS resources may be transmitted in different symbols. In some embodiments, when the capability message indicates a 2T6R SRS resource set configuration, the configuration message may indicate three SRS resources. Additionally, when the capability message indicates a 2T6R SRS resource set configuration, the configuration message may indicate each SRS resource includes two SRS ports. Further, when the capability message indicates a 2T6R SRS resource set configuration, the configuration message may indicate that the three SRS resources may be transmitted in different symbols. In some embodiments, when the capability message indicates a 2T8R SRS resource set configuration, the configuration message may indicate four SRS resources. Additionally, when the capability message indicates a 2T8R SRS resource set configuration, the configuration message may indicate that each SRS resource may include two SRS ports. Further, when the capability message indicates a 2T8R SRS resource set configuration, the configuration message may indicate that the four SRS resources may be transmitted in different symbols.

In some embodiments, the configuration message may indicate that at least two SRS resource sets may be configured with a resource type of aperiodic. In some embodiments, when the capability message indicates a 1T6R SRS resource set configuration, the configuration message may indicate a first set of SRS resources and a second set of SRS resources. Additionally, when the capability message indicates a 1T6R SRS resource set configuration, the configuration message may indicate that each SRS resource in the first set of SRS resources may include one SRS port and that each SRS resource in the second set of SRS resources may include one SRS port. Further, when the capability message indicates a 1T6R SRS resource set configuration, the configuration message may indicate a total of six SRS resources are between the first set of SRS resources and the second set of SRS resources. In some embodiments, when the capability message indicates a 2T6R SRS resource set configuration, the configuration message may indicate a first set of SRS resources and a second set of SRS resources. Additionally, when the capability message indicates a 2T6R SRS resource set configuration, the configuration message may indicate that each SRS resource in the first set of SRS resources includes two SRS ports and that each SRS resource in the second set of SRS resources includes one SRS port. Further, when the capability message indicates a 2T6R SRS resource set configuration, the configuration message may indicate a total of three SRS resources between the first set of SRS resources and the second set of SRS resources. In some embodiments, when the capability message indicates a 2T8R SRS resource set configuration, the configuration message may indicate a first set of SRS resources and a second set of SRS resources. Additionally, when the capability message indicates a 2T8R SRS resource set configuration, the configuration message may indicate that each SRS resource in the first set of SRS resources includes two SRS ports and that each SRS resource in the second set of SRS resources includes two SRS ports. Further, when the capability message indicates a 2T8R SRS resource set configuration, the configuration message may indicate a total of four SRS resources between the first set of SRS resources and the second set of SRS resources.

In some embodiments, the configuration message may indicate that at least three SRS resource sets are configured with a resource type of aperiodic. In some embodiments, when the capability message indicates a 1T6R SRS resource set configuration, the configuration message may indicate a first set of SRS resources, a second set of SRS resources, and a third set of SRS resources. Additionally, when the capability message indicates a 1T6R SRS resource set configuration, the configuration message may indicate that each SRS resource in the first set of SRS resources includes one SRS port, that each SRS resource in the second set of SRS resources includes one SRS port, and that each SRS resource in the third set of SRS resources includes one SRS port. Further, when the capability message indicates a 1T6R SRS resource set configuration, the configuration message may indicate a total of six SRS resources between the first set of SRS resources, the second set of SRS resources, and the third set of SRS resources.

In some embodiments, when the capability message indicates a 4T8R SRS resource set configuration, the configuration message may indicate that up to two SRS resource sets are configured with a different resource type, where resource types include periodic, semi-persistent, or aperiodic. In some embodiments, the configuration message may indicate that each SRS resource set includes four SRS ports.

In some embodiments, when the capability message indicates a 1T8R SRS resource set configuration, the configuration message may indicate that more than two SRS resource sets are configured with a resource type of aperiodic. In some embodiments, the configuration message may indicate at least a first set of SRS resources and a second set of SRS resources. Additionally, the configuration message may indicate that each SRS resource in the first set of SRS resources includes one SRS port and that each SRS resource in the second set of SRS resources includes one SRS port. Further, the configuration message may indicate a total of eight SRS resources between the first set of SRS resources and the second set of SRS resources.

In some embodiments, when the capability message indicates a 1T8R SRS resource set configuration, the configuration message may indicate at least a first set of SRS resources, a second set of SRS resources, and a third set of SRS resources. Additionally, the configuration message may indicate that each SRS resource in the first set of SRS resources includes one SRS port, that each SRS resource in the second set of SRS resources includes one SRS port, and that each SRS resource in the third set of SRS resources includes one SRS port. Further, the configuration message may indicate a total of eight SRS resources between the first set of SRS resources, the second set of SRS resources, and the third set of SRS resources.

In some embodiments, when the capability message indicates a 1T8R SRS resource set configuration, the configuration message may indicate at least a first set of SRS resources, a second set of SRS resources, a third set of SRS resources, and a fourth set of SRS resources. Additionally, the configuration message may indicate that each SRS resource in the first set of SRS resources includes one SRS port, that each SRS resource in the second set of SRS resources includes one SRS port, that each SRS resource in the third set of SRS resources includes one SRS port, and that each SRS resource in the fourth set of SRS resources includes one SRS port. Further, the configuration message may indicate a total of eight SRS resources between the first set of SRS resources, the second set of SRS resources, the third set of SRS resources, and the fourth set of SRS resources.

At 806, the base station may receive, from the UE, one or more SRSs. In some embodiments, the one or more SRSs may be received according to the SRS antenna switching configuration.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment device (UE), comprising:
at least one antenna;
a radio operably coupled to the at least one antenna; and
a processor operably coupled to the radio;
wherein the processor is configured to cause the UE to:
  transmit, to a base station, a capability message indicating an antenna configuration associated with SRS antenna switching, wherein the capability message indicates at least one of a one transmit point (1T) and six receive point (6R) SRS resource set configuration, a 1T8R SRS resource set configuration, a 2T6R SRS resource set configuration, a 2T8R SRS resource set configuration, or a 4T8R SRS resource set configuration;
  receive, from the base station, a configuration message, wherein the configuration message indicates an SRS antenna switching configuration, wherein the SRS antenna switching configuration is based, at least in part, on the capability message, wherein, when at least two SRS resource sets are configured with a resource type of aperiodic,
  wherein, when the capability message indicates a 1T6R SRS resource set configuration:
    the configuration message indicates a first set of SRS resources and a second set of SRS resources,
    each SRS resource in the first set of SRS resources includes one SRS port,
    each SRS resource in the second set of SRS resources includes one SRS port, and
    a total of six SRS resources are indicated between the first set of SRS resources and the second set of SRS resources, and
  wherein, when the capability message indicates a 2T8R SRS resource set configuration:
    the configuration message indicates a first set of SRS resources and a second set of SRS resources,
    each SRS resource in the first set of SRS resources includes two SRS ports,
    each SRS resource in the second set of SRS resources includes two SRS ports, and
    a total of four SRS resources are indicated between the first set of SRS resources and the second set of SRS resources; and transmit, to the base station, one or more SRSs according to the SRS antenna switching configuration.

2. The UE of claim 1,
wherein, when at least one SRS resource set is configured with a resource type of periodic or semi-persistent and the capability message indicates a 1T6R SRS resource set configuration, the configuration message indicates six SRS resources, wherein each SRS resource includes one SRS port, and wherein the six SRS resources are transmitted in different symbols.

3. The UE of claim 1,
wherein, when at least one SRS resource set is configured with a resource type of periodic or semi-persistent and the capability message indicates a 2T6R SRS resource set configuration, the configuration message indicates three SRS resources, wherein each SRS resource includes two SRS ports, and wherein the three SRS resources are transmitted in different symbols.

4. The UE of claim 1,
wherein, when at least one SRS resource set is configured with a resource type of periodic or semi-persistent and the capability message indicates a 2T8R SRS resource set configuration, the configuration message indicates four SRS resources, wherein each SRS resource includes two SRS ports; and wherein the four SRS resources are transmitted in different symbols.

5. The UE of claim 1,
wherein, when at least two SRS resource sets are configured with a resource type of aperiodic and the capability message indicates a 2T6R SRS resource set configuration, the configuration message indicates a first set of SRS resources and a second set of SRS resources, wherein each SRS resource in the first set of SRS resources includes two SRS ports, wherein each SRS resource in the second set of SRS resources includes two SRS port, and wherein a total of three SRS resources are indicated between the first set of SRS resources and the second set of SRS resources.

6. The UE of claim 1,
wherein, when up to two SRS resource sets are configured with a different resource type and resource types include periodic, semi-persistent, or aperiodic, the configuration message indicates that each SRS resource includes four SRS ports, and wherein the capability message indicates a 4T8R SRS resource set configuration.

7. A baseband processor of a user equipment device (UE) in a wireless communication system configured to:
generate instructions to transmit, to a base station via higher layer signaling, a capability message indicating an antenna configuration associated with SRS antenna switching, wherein the capability message indicates at least one of a one transmit point (1T) and six receive point (6R) SRS resource set configuration, a 1T8R SRS resource set configuration, a 2T6R SRS resource set configuration, a 2T8R SRS resource set configuration, or a 4T8R SRS resource set configuration;
receive, from the base station via higher layer signaling, a configuration message, wherein the configuration message indicates an SRS antenna switching configuration, wherein the SRS antenna switching configuration is based, at least in part, on the capability message, wherein, when at least three SRS resource sets are configured with a resource type of aperiodic and the capability message indicates a 1T6R SRS resource set configuration:

the configuration message indicates a first set of SRS resources, a second set of SRS resources, and a third set of SRS resources,
each SRS resource in the first set of SRS resources includes one SRS port,
each SRS resource in the second set of SRS resources includes one SRS port,
each SRS resource in the third set of SRS resources includes one SRS port, and
a total of six SRS resources are indicated between the first set of SRS resources, the second set of SRS resources, and the third set of SRS resources, and
wherein, when at least two SRS resource sets are configured with a resource type of aperiodic and the capability message indicates a 2T8R SRS resource set configuration:
the configuration message indicates a first set of SRS resources and a second set of SRS resources,
each SRS resource in the first set of SRS resources includes two SRS ports,
each SRS resource in the second set of SRS resources includes two SRS ports, and
a total of four SRS resources are indicated between the first set of SRS resources and the second set of SRS resources; and
generate instructions to transmit, to the base station, one or more SRSs according to the SRS antenna switching configuration.

8. The baseband processor of claim 7,
wherein, when up to two SRS resource sets are configured with a different resource type and resource types include periodic, semi-persistent, or aperiodic, the configuration message indicates that each SRS resource includes four SRS ports, and wherein the capability message indicates a 4T8R SRS resource set configuration.

9. The baseband processor of claim 7,
wherein, when two SRS resource sets are configured with a resource type of aperiodic and the configuration message indicates at least a first set of SRS resources and a second set of SRS resources, wherein each SRS resource in the first set of SRS resources includes one SRS port, wherein each SRS resource in the second set of SRS resources includes one SRS port, and wherein a total of eight SRS resources are indicated between the first set of SRS resources and the second set of SRS resources.

10. The baseband processor of claim 7,
wherein, when more than two SRS resource sets are configured with a resource type of aperiodic and configuration message indicates at least a first set of SRS resources, a second set of SRS resources, and a third set of SRS resources, wherein each SRS resource in the first set of SRS resources includes one SRS port, wherein each SRS resource in the second set of SRS resources includes one SRS port, wherein each SRS resource in the third set of SRS resources includes one SRS port, and wherein a total of eight SRS resources are indicated between the first set of SRS resources, the second set of SRS resources, and the third set of SRS resources.

11. The baseband processor of claim 7,
wherein, when more than two SRS resource sets are configured with a resource type of aperiodic and the configuration message indicates at least a first set of SRS resources, a second set of SRS resources, a third set of SRS resources, and a fourth set of SRS resources, wherein each SRS resource in the first set of SRS resources includes one SRS port, wherein each SRS resource in the second set of SRS resources includes one SRS port, wherein each SRS resource in the third set of SRS resources includes one SRS port, wherein each SRS resource in the fourth set of SRS resources includes one SRS port, and wherein a total of eight SRS resources are indicated between the first set of SRS resources, the second set of SRS resources, the third set of SRS resources, and the fourth set of SRS resources.

12. The baseband processor of claim 7,
wherein, when at least one SRS resource set is configured with a resource type of periodic or semi-persistent and the capability message indicates a 2T8R SRS resource set configuration:
  the configuration message indicates four SRS resources,
  each SRS resource includes two SRS ports, and
  the four SRS resources are transmitted in different symbols.

13. The baseband processor of claim 7,
wherein, when at least two SRS resource sets are configured with a resource type of aperiodic and the capability message indicates a 1T6R SRS resource set configuration:
  the configuration message indicates a first set of SRS resources and a second set of SRS resources,
  each SRS resource in the first set of SRS resources includes one SRS port,
  each SRS resource in the second set of SRS resources includes one SRS port, and
  a total of six SRS resources are indicated between the first set of port, and SRS resources and the second set of SRS resources.

14. The baseband processor of claim 7,
wherein, when at least two SRS resource sets are configured with a resource type of aperiodic and the capability message indicates a 2T6R SRS resource set configuration:
  the configuration message indicates a first set of SRS resources and a second set of SRS resources,
  each SRS resource in the first set of SRS resources includes two SRS ports,
  each SRS resource in the second set of SRS resources includes two SRS port, and
  a total of three SRS resources are indicated between the first set of SRS resources and the second set of SRS resources.

15. A base station, comprising:
a plurality of antennas;
a radio operably coupled to the plurality of antennas; and
a processor operably coupled to the radio;
wherein the processor is configured to cause the base station to:
  receive, from a user equipment device (UE), a capability message indicating an antenna configuration associated with SRS antenna switching, wherein the capability message indicates at least one of a one transmit point (1T) and six receive point (6R) SRS resource set configuration, a 1T8R SRS resource set configuration, a 2T6R SRS resource set configuration, a 2T8R SRS resource set configuration, or a 4T8R SRS resource set configuration;
  transmit, to the UE, a configuration message, wherein the configuration message indicates an SRS antenna switching configuration, wherein the SRS antenna switching configuration is based, at least in part, on the capability message, wherein up to two SRS resource sets are configured with a different resource type, wherein resource types include periodic, semi-persistent, or aperiodic, wherein the configuration message indicates that each SRS resource includes four SRS ports, wherein, when the capability message indicates a 4T8R SRS resource set configuration, no more than two SRS resource sets are configured with a resource type of aperiodic, and wherein, when at least two SRS resource sets are configured with a resource type of aperiodic and the capability message indicates a 2T8R SRS resource set configuration:
    the configuration message indicates a first set of SRS resources and a second set of SRS resources,
    each SRS resource in the first set of SRS resources includes two SRS ports,
    each SRS resource in the second set of SRS resources includes two SRS ports, and
    a total of four SRS resources are indicated between the first set of SRS resources and the second set of SRS resources; and
  receive, from the UE, one or more SRSs according to the SRS antenna switching configuration.

16. The base station of claim 15,
wherein, when at least one SRS resource set is configured with a resource type of periodic or semi-persistent and the capability message indicates a 1T6R SRS resource set configuration, the configuration message indicates six SRS resources, wherein each SRS resource includes one SRS port, and wherein the six SRS resources are transmitted in different symbols;
wherein, when at least one SRS resource set is configured with a resource type of periodic or semi-persistent and the capability message indicates a 2T6R SRS resource set configuration, the configuration message indicates three SRS resources, wherein each SRS resource includes two SRS ports, and wherein the three SRS resources are transmitted in different symbols; and
wherein, when at least one SRS resource set is configured with a resource type of periodic or semi-persistent and the capability message indicates a 2T8R SRS resource set configuration, the configuration message indicates four SRS resources, wherein each SRS resource includes two SRS ports, and wherein the four SRS resources are transmitted in different symbols.

17. The base station of claim 15,
wherein, when at least two SRS resource set are configured with a resource type of aperiodic and the capability message indicates a 1T6R SRS resource set configuration, the configuration message indicates a first set of SRS resources and a second set of SRS resources, wherein each SRS resource in the first set of SRS resources includes one SRS port, wherein each SRS resource in the second set of SRS resources includes one SRS port, and wherein a total of six SRS resources are indicated between the first set of SRS resources and the second set of SRS resources.

18. The base station of claim 15,
wherein, when at least three SRS resource sets are configured with a resource type of aperiodic and the capability message indicates a 1T6R SRS resource set configuration, the configuration message indicates a first set of SRS resources, a second set of SRS resources, and a third set of SRS resources, wherein each SRS resource in the first set of SRS resources includes one SRS port, wherein each SRS resource in the second set of SRS resources includes one SRS port, wherein each SRS resource in the third set of SRS resources includes one SRS port, and wherein a total of six SRS resources are indicated between the first set of SRS resources, the second set of SRS resources, and the third set of SRS resources.

19. The base station of claim 15,
wherein, when up to two SRS resource sets are configured with a different resource type and resource types include periodic, semi-persistent, or aperiodic, the configuration message indicates that each SRS resource includes four SRS ports, wherein the capability message indicates a 4T8R SRS resource set configuration, and wherein no more than two SRS resource sets are configured with a resource type of aperiodic.

20. The base station of claim 19,
wherein, when the configuration message indicates at least a first set of SRS resources and a second set of SRS resources, each SRS resource in the first set of SRS resources includes one SRS port and each SRS resource in the second set of SRS resources includes one SRS port;
wherein, when the configuration message indicates at least a first set of SRS resources, a second set of SRS resources, and a third set of SRS resources, each SRS resource in the first set of SRS resources includes one SRS port, each SRS resource in the second set of SRS resources includes one SRS port, and each SRS resource in the third set of SRS resources includes one SRS port;
wherein, when the configuration message indicates at least a first set of SRS resources, a second set of SRS resources, a third set of SRS resources, and a fourth set of SRS resources, each SRS resource in the first set of SRS resources includes one SRS port, each SRS resource in the second set of SRS resources includes one SRS port, each SRS resource in the third set of SRS resources includes one SRS port, and each SRS resource in the fourth set of SRS resources includes one SRS port; and
wherein, when the configuration message indicates at least a first set of SRS resources, a second set of SRS resources, a third set of SRS resources, and a fourth set of SRS resources, each SRS resource in the first set of SRS resources includes one SRS port, each SRS resource in the second set of SRS resources includes one SRS port, each SRS resource in the third set of SRS resources includes one SRS port, and each SRS resource in the fourth set of SRS resources includes one SRS port.

\* \* \* \* \*